US011236661B2

(12) United States Patent
Renault

(10) Patent No.: US 11,236,661 B2
(45) Date of Patent: Feb. 1, 2022

(54) PRESSURE REGULATOR WARM UP SYSTEM FOR A TRANSPORT REFRIGERATION UNIT

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 20 days.

(21) Appl. No.: 16/732,863

(22) Filed: Jan. 2, 2020

(65) Prior Publication Data

US 2020/0208563 A1    Jul. 2, 2020

(30) Foreign Application Priority Data

Jan. 2, 2019    (EP) ..................... 19305002

(51) Int. Cl.
| | |
|---|---|
| *F01P 7/16* | (2006.01) |
| *B60H 1/32* | (2006.01) |
| *F01P 3/20* | (2006.01) |
| *F01P 7/14* | (2006.01) |

(52) U.S. Cl.
CPC ............ *F01P 7/165* (2013.01); *B60H 1/3232* (2013.01); *F01P 3/20* (2013.01); *F01P 2007/146* (2013.01); *F01P 2050/30* (2013.01); *F01P 2060/08* (2013.01); *F25B 2327/001* (2013.01)

(58) Field of Classification Search
CPC ........ F01P 2007/146; F01P 3/20; F01P 7/165; B60H 1/3232
See application file for complete search history.

(56) References Cited

U.S. PATENT DOCUMENTS

| | | |
|---|---|---|
| 4,688,537 A | 8/1987 | Calkins et al. |
| 5,330,031 A | 7/1994 | Hill et al. |
| 6,026,789 A | 2/2000 | Arai et al. |
| 6,041,762 A | 3/2000 | Sirosh et al. |
| 7,156,055 B1 | 1/2007 | Craig |
| 2003/0106538 A1 | 6/2003 | Benson |

(Continued)

FOREIGN PATENT DOCUMENTS

| | | |
|---|---|---|
| AT | E368801 T | 8/2007 |
| AU | 200066784 A1 | 3/2001 |

(Continued)

OTHER PUBLICATIONS

European Search Report for application EP 19305002.8, dated Jun. 17, 2019, 8 pages.

(Continued)

*Primary Examiner* — Kevin A Lathers

(74) *Attorney, Agent, or Firm* — Cantor Colburn LLP

(57) ABSTRACT

A fluid circuit for a trucking vehicle having a transport refrigeration unit is provided. The fluid circuit includes a first regulator assembly defining a first fuel inlet that is arranged to receive fuel from a first fuel tank and a first fuel outlet that is arranged to provide fuel to a first engine. The first regulator assembly having a first heat exchanger assembly defining a first coolant inlet that is arranged to receive coolant from a cooling system associated with the first engine and a first coolant outlet that is arranged to provide coolant to the cooling system.

10 Claims, 3 Drawing Sheets

(56) References Cited

U.S. PATENT DOCUMENTS

| | | | |
|---|---|---|---|
| 2014/0090723 A1 | 4/2014 | Toale et al. | |
| 2014/0137953 A1 | 5/2014 | Gibb et al. | |
| 2014/0138045 A1* | 5/2014 | Sloane | B60H 1/3226 165/42 |
| 2015/0165871 A1* | 6/2015 | Miller | B60H 1/2209 237/28 |

FOREIGN PATENT DOCUMENTS

| | | |
|---|---|---|
| AU | 2006324322 A1 | 6/2007 |
| BR | 200101855 A1 | 6/2001 |
| CA | 2155974 A1 | 8/1994 |
| CA | 2158505 A1 | 3/1996 |
| CA | 2875413 A1 | 6/2015 |
| CN | 102815182 A | 12/2012 |
| CN | 105026740 A | 11/2015 |
| CN | 105026742 A | 11/2015 |
| DE | 3044744 C1 | 3/1982 |
| DE | 69500678 T2 | 3/1998 |
| DE | 102004057466 A1 | 6/2006 |
| EP | 3333405 A1 | 6/2018 |
| KR | 136012 U | 3/1999 |
| WO | 2018051164 A1 | 3/2018 |

OTHER PUBLICATIONS

Go With Natural Gas, "Evaluation of the Winter Performance of Compressed Natural Gas Refuse Trucks", available at: https://www.bing.com/search?q=Evaluation+of+the+Winter+Performance+ofCompressed+Natural+Gas+Refuse+Trucks&src=IE-TopResult&FORM=IETR02&conversationid=, Nov. 2013, 42 pages.

* cited by examiner

PRESSURE REGULATOR WARM UP SYSTEM FOR A TRANSPORT REFRIGERATION UNIT

FOREIGN PRIORITY

This application claims priority to European Patent Application No. 19305002.8, filed Jan. 2, 2019, and all the benefits accruing therefrom under 35 U.S.C. § 119, the contents of which in its entirety are herein incorporated by reference.

BACKGROUND

The following description relates to transport refrigeration units.

Conventional trucking vehicles are typically provided with at least one tank that stores fuel to be used in the TRU. During certain operating conditions, a pressure regulating valve may freeze or frost, inhibiting the delivery of fuel to the TRU.

BRIEF DESCRIPTION

According to an aspect of the disclosure, a fluid circuit provided with a trucking vehicle having a transport refrigeration unit is provided. The fluid circuit includes a first regulator assembly defining a first fuel inlet that is arranged to receive fuel from a first fuel tank and a first fuel outlet that is arranged to provide fuel to a first engine. The first regulator assembly having a first heat exchanger assembly defining a first coolant inlet that is arranged to receive coolant from a cooling system associated with the first engine and a first coolant outlet that is arranged to provide coolant to the cooling system.

In accordance with additional or alternative embodiments, a second regulator assembly defining a second fuel inlet that is arranged to receive fuel from a second fuel tank and a second fuel outlet that is arranged to provide fuel to a second engine associated with a transport refrigeration unit.

In accordance with additional or alternative embodiments, the second regulator assembly having a second heat exchanger assembly defining a second coolant inlet that is arranged to receive coolant from the cooling system associated with the first engine and a second coolant outlet that is arranged to provide coolant to the cooling system.

In accordance with additional or alternative embodiments, the second heat exchanger assembly is arranged to heat the fuel received from the second fuel tank that is provided to the second engine of the transport refrigeration unit.

In accordance with additional or alternative embodiments, the first regulator assembly defining a second fuel inlet that is arranged to receive fuel from a second fuel tank and a second fuel outlet that is arranged to provide fuel to a second engine associated with a transport refrigeration unit.

In accordance with additional or alternative embodiments, the first heat exchanger is arranged to heat the fuel received from the first fuel tank that is provided to the first engine and heat the fuel received from the second fuel tank that is provided to the second engine.

In accordance with additional or alternative embodiments, a fluid pump arranged to facilitate a fluid flow of coolant from the cooling system associated with the first engine towards at least one of the first coolant inlet and the second coolant inlet.

In accordance with additional or alternative embodiments, a heater arranged to heat the fluid flow of coolant from the cooling system.

In accordance with additional or alternative embodiments, a controller in communication with the fluid pump and the heater, the controller programmed to, while the first engine is off, operate the fluid pump and the heater, responsive to at least one of an ambient temperature being less than a threshold and an ambient humidity being greater than a threshold.

According to another aspect of the disclosure, a method of warming a regulator assembly. The method includes receiving a first portion of fuel through a first fuel inlet of a first regulator assembly; receiving coolant from a cooling system associated with a first engine through a first coolant inlet of a first heat exchanger assembly associated with the first regulator assembly; heating the fuel received through the first fuel inlet with the coolant; directing the coolant through a first coolant outlet of the first heat exchanger assembly towards the cooling system associated with the first engine; and providing the first portion of fuel through a first fuel outlet of the first regulator assembly to the first engine.

In accordance with additional or alternative embodiments, receiving a second portion of fuel through a second fuel inlet of the first regulator assembly; heating the second portion of fuel received through the second fuel inlet with the coolant; and providing the second portion of fuel through a second fuel outlet of the first regulator assembly to a second engine associated with a transport refrigeration unit.

In accordance with additional or alternative embodiments, receiving a second portion of fuel through a second fuel inlet of a second regulator assembly; receiving coolant from the cooling system associated with the first engine through a second coolant inlet of a second heat exchanger assembly associated with the second regulator assembly; heating the second portion of fuel received through the second fuel inlet with the coolant; and providing the second portion of fuel through a second fuel outlet of the second regulator assembly to a second engine associated with a transport refrigeration unit.

In accordance with additional or alternative embodiments, heating the coolant with a heater operatively connected to the cooling system.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
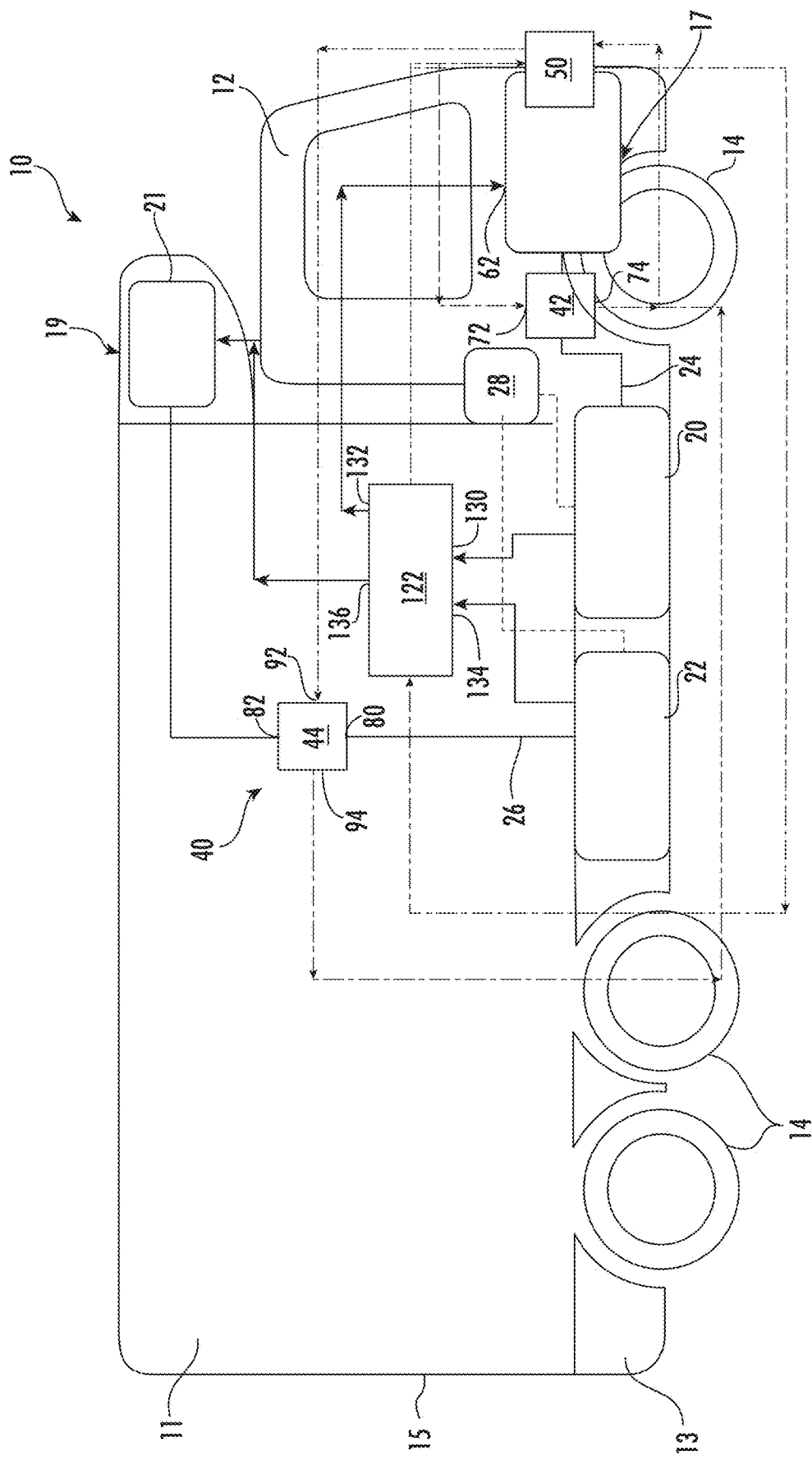
FIG. 1 is a side view of a trucking vehicle in accordance with embodiments of the present disclosure.

Referring to FIG. 1, a vehicle 10, such as a trucking vehicle is schematically illustrated. The vehicle 10 includes a vehicle body 11 having a cab 12, a chassis/bed 13 that extends from the cab 12, wheels 14 that are arrayed beneath the cab 12 and the bed 13, and a container 15 that is supportively disposed on the bed 13. The vehicle 10 may be configured as a trucking vehicle although it is to be understood that other embodiments exist and that the use of the trucking vehicle as the example is only done for clarity and brevity. The vehicle 10 further includes a first engine 17, a cabin 18, and a TRU 19. The first engine 17 may be provided as a diesel engine, a compressed natural gas engine, or other type of internal combustion engine. The first engine 17 is arranged to generate power to facilitate propulsion of the vehicle 10. A first fuel tank 20 is associated with the first engine 17 and is arranged to provide a fuel, such as compressed natural gas, to the first engine 17.

The cabin 18 is housed in the cab 12 and is formed to accommodate at least a driver as well as vehicle control elements, such as a steering wheel, a user interface device for controlling at least the first engine 17, movements of the vehicle 10, operations of the TRU 19, and a controller of a fluid circuit that is arranged to warm-up or heat a pressure regulating valve assembly associated with the delivery of a fuel, such as natural gas, to at least one of the first engine 17 and/or an engine associated with the TRU 19. The TRU 19 includes a second engine 21 that is configured to burn a fuel such as natural gas to provide power to the TRU 19 by which an interior of a compartment of the container 15 is conditioned. A second fuel tank 22 is associated with the second engine 21 and is arranged to provide fuel, such as to the second engine 21.

The first fuel tank 20 and the second fuel tank 22 are supported on the vehicle body 11, more particularly on the bed 13. A first fluid conduit 24 extends between and is fluidly connected to first fuel tank 20 and the first engine 17. A second fluid conduit 26 extends between and is fluidly connected to the second fuel tank 22 and the second engine 21 of the TRU 19. A gas filling point 28 is disposed on a portion of the vehicle body 11 and may be fluidly connected to the first fuel tank 20 and the second fuel tank 22.

Fuel from the first fuel tank 20 may be expanded through a regulator assembly prior to delivery to the first engine 17 and fuel from the second fuel tank 22 may be expanded through a valve or regulator associated with the regulator assembly prior to delivery to the second engine 21. The expansion of the fuel within or through the regulator assembly may cause frosting or freezing of various components of the valve assembly during low ambient temperature conditions and/or high humidity conditions after a period of continuous operation. The frosting or freezing of the various components of the valve assembly may result in blockage of the valve assembly and may inhibit or affect the flow of fuel from the first fuel tank to the first engine 17 and/or the second fuel tank 22 to the second engine 21 or cause regulation of the fuel flow that is outside of designed ranges.

Figure 2:
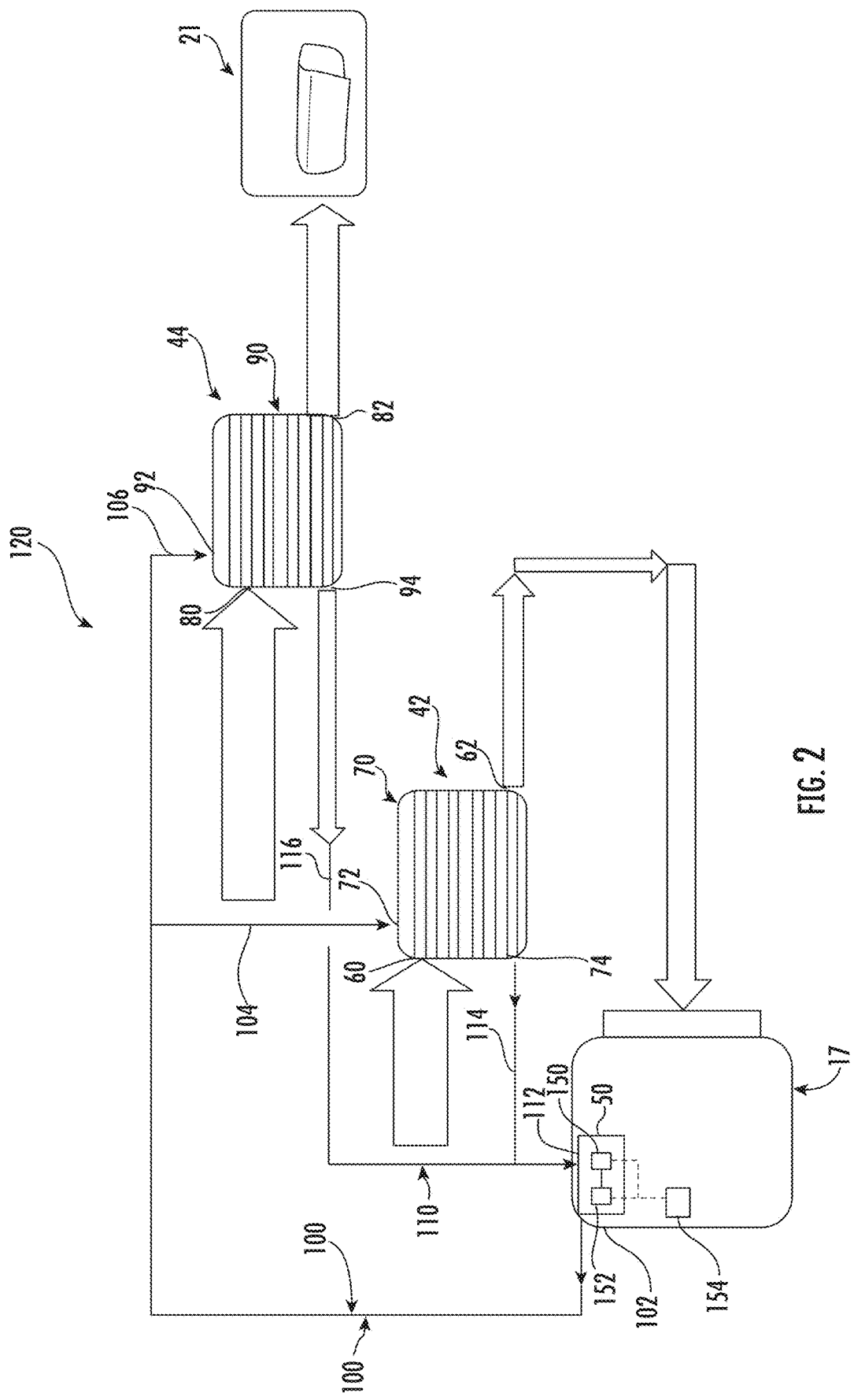
FIG. 2 is a schematic illustration of a fluid circuit arranged to heat a regulator assembly.

Referring to FIGS. 1 and 2, a fluid circuit 40 may be provided to warm up a first regulator assembly 42 that is associated with the first engine 17 and warm up a second regulator assembly 44 that is associated with the second engine 21 of the transport refrigeration unit 19 by heating fuel that passes through the regulator assemblies. The fluid circuit 40 is arranged to prevent or inhibit the freezing of regulators or valve assemblies associated with the first regulator assembly 42 and the second regulator assembly 44 during low ambient temperatures and/or high humidity conditions. The fluid circuit 40 is arranged to direct coolant from a cooling system 50 to warm up the first regulator assembly 42 and the second regulator assembly 44. In such an arrangement, the fluid circuit 40 may operate as an extension of the cooling system 50. As illustrated, the cooling system 50 is associated with the first engine 17, however, the cooling system may be associated with the second engine 21 or both the first engine 17 and the second engine 21.

The first regulator assembly 42 defines a first fuel inlet 60 and a first fuel outlet 62. The first fuel inlet 60 is arranged to receive a first portion of fuel from the first fuel tank 20. The first portion of fuel received from the first fuel tank 20 by the first fuel inlet 60 may be received at a high pressure. The first fuel outlet 62 is arranged to provide the first portion of fuel to the first engine 17. The fuel provided to the first engine 17 may be provided at a lower pressure than the received fuel due to the expansion of the fuel within or by a valve or regulator of the first regulator assembly 42.

The first regulator assembly 42 has a first heat exchanger assembly 70 that is associated with a valve or regulator of the first regulator assembly 42. The first heat exchanger assembly 70 may be integrated with the valve or regulator of the first regulator assembly 42. The first heat exchanger assembly 70 is arranged to utilize coolant from the cooling system 50 to heat the first portion of fuel received through the first regulator assembly 42. The first heat exchanger assembly 70 defines a first coolant inlet 72 and a first coolant outlet 74. The first coolant inlet 72 is arranged to receive coolant from the cooling system 50. The first coolant outlet 74 is arranged to provide, return, or direct coolant towards the cooling system 50.

The second regulator assembly 44 defines a second fuel inlet 80 and a second fuel outlet 82. The second fuel inlet 80 is arranged to receive a second portion of fuel from the second fuel tank 22. The second portion of fuel received from the second fuel tank 22 by the second fuel inlet 80 may be received at a high pressure. The second fuel outlet 82 is arranged to provide the second portion of fuel to the second engine 21 of the transport refrigeration unit 19. The second portion of fuel provided to the second engine 21 may be provided at a lower pressure than the received fuel due to the expansion of the fuel within or by a valve or regulator of the second regulator assembly 44.

The second regulator assembly 44 has a second heat exchanger assembly 90 that is associated with a valve or regulator of the second regulator assembly 44. The second heat exchanger assembly 90 may be integrated with the valve or regulator. The second heat exchanger assembly 90 is arranged to utilize coolant from the cooling system 50 to heat the second portion of fuel received through the second regulator assembly 44. The second heat exchanger assembly 90 defines a second coolant inlet 92 and a second coolant outlet 94. The second coolant inlet 92 is arranged to receive coolant from the cooling system 50. The second coolant outlet 94 is arranged to provide or return coolant to the cooling system 50.

A first conduit 100 extends from a coolant outlet 102 of the cooling system 50 and extends towards and fluidly connects to the first heat exchanger assembly 70 and the second heat exchanger assembly 90. A first branch 104 extends from a portion of the first conduit 100 to fluidly connect the coolant outlet 102 to the first coolant inlet 72 of the first heat exchanger assembly 70. A second branch 106 extends from a portion of the first conduit 100 to fluidly connect the coolant outlet 102 to the second coolant inlet 92 of the second heat exchanger assembly 90.

A second conduit 110 is fluidly connected to a coolant inlet 112 of the cooling system 50. The second conduit 110 receives coolant from the first heat exchanger assembly 70 and the second heat exchanger assembly 90 and returns the coolant to the cooling system 50. A first branch 114 extends from a portion of the second conduit 110 to fluidly connect the coolant inlet 112 to the first coolant outlet 74 of the first heat exchanger assembly 70. A second branch 116 extends from a portion of the second conduit 110 to fluidly connect the coolant inlet 112 to the second coolant outlet 94 of the second heat exchanger assembly 90.

Figure 3:
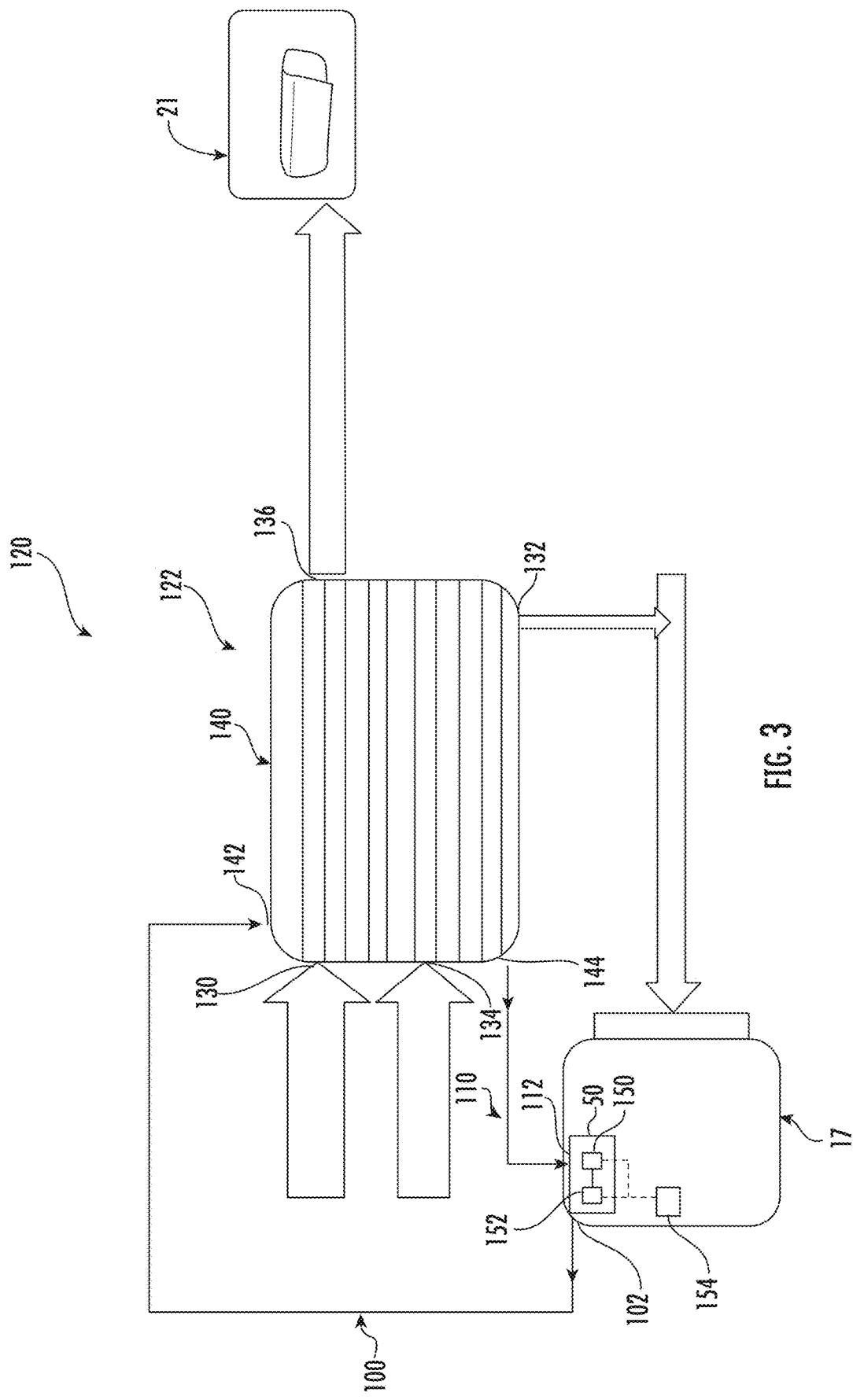
FIG. 3 is a schematic illustration of a fluid circuit arranged to heat a regulator assembly.

Referring to FIGS. 1 and 3, a fluid circuit 120 may be provided to warm up a first regulator assembly 122 that is associated with the first engine 17 and the second engine 21 of the transport refrigeration unit 19. The fluid circuit 120 is arranged to prevent or inhibit the freezing of regulators or valve assemblies associated with the first regulator assembly 122 during low ambient temperatures and/or high humidity conditions.

The first regulator assembly 122 is arranged as a dual stage regulator that provides fuel to both the first engine 17 and the second engine 21. The first regulator assembly 122 defines a first fuel inlet 130, a first fuel outlet 132, a second fuel inlet 134, and a second fuel outlet 136. The first fuel inlet 130 is arranged to receive a first portion of fuel from the first fuel tank 20. The first fuel outlet 132 is arranged to provide the first portion of fuel to the first engine 17. The second fuel inlet 134 is arranged to receive a second portion of fuel from the second fuel tank 22. The second fuel outlet 136 is arranged to provide the second portion of fuel to the second engine 21 of the transport refrigeration unit 19.

The first regulator assembly 122 has a first heat exchanger assembly 140 that is associated with a valve or regulator of the first regulator assembly 122. The first heat exchanger assembly 140 may be integrated with the valve or regulator. The first heat exchanger assembly 140 is arranged to utilize coolant from the cooling system 50 to heat the first portion of fuel and the second portion of fuel received through the first regulator assembly 122. The first heat exchanger assembly 140 defines a first coolant inlet 142 and a first coolant outlet 144. The first conduit 100 extends between the first coolant inlet 142 and the coolant outlet 102 of the cooling system 50. The first coolant inlet 142 is arranged to receive coolant from the coolant outlet 102 of the cooling system 50. The second conduit 110 extends between the first coolant outlet 144 and the coolant inlet 112 of the cooling system 50. The first coolant outlet 144 is arranged to provide, return, or direct coolant towards coolant inlet 112 of the cooling system 50.

Referring to FIGS. 1-3, a fluid pump 150, a heater 152, and a controller 154 may be provided with the fluid circuit 40 and/or the fluid circuit 120. The fluid pump 150, the heater 152, and a controller 154 are arranged to enable the heating of fuel provided to the second engine 21 in case the first engine 17 is switched off, during low ambient conditions.

Referring to FIG. 2, the fluid pump 150 is arranged to facilitate a fluid flow of coolant from the cooling system 50 associated with the first engine 17 towards the first coolant inlet 72 of the first heat exchanger assembly 70 and towards the second coolant inlet 92 of the second heat exchanger assembly 90 through the first conduit 100. Referring to FIG. 3, the fluid pump 150 is arranged to facilitate a fluid flow of coolant from the cooling system 50 associated with the first engine 17 towards the first coolant inlet 142 of the first heat exchanger assembly 140.

The heater 152 is arranged to heat the fluid flow of coolant that is provided through the first conduit 100 from the cooling system 52 a valve or regulator. The heating of the coolant enables the heating of fuel that flows through a regulator assembly associated with the first engine 17 and/or the second engine 21.

The controller 154 may be a separately provided controller or may be provided as part of the user interface device as previously described. The controller 154 is in communication with the fluid pump 150 and the heater 152. The controller 154 is programmed to, all the first engine 17 is off, to operate the fluid pump 150 and the heater 152, responsive to at least one of an ambient temperature being less than a threshold and an ambient humidity being greater than a threshold.

The fluid circuit 40 and/or the fluid circuit 120 utilizes coolant from a cooling system 50 associated with the first engine 17 and/or the second engine 21 to warm up or heat fuel provided through a valve or regulator associated with a regulator assembly arranged to provide fuel to the first engine 17 and/or the second engine 21. The heating of the fuel heats the valve of regulator associated with the regulator assembly to inhibit the frosting, freezing, or blocking of components to ensure the flow of fuel to the second engine 21 of the TRU 19. The fluid circuit 40 and/or the fluid circuit 120 may also utilize a heater 152 to heat a coolant to warm up or heat valve or regulator associated with a regulator assembly arranged to provide fuel to the first engine 17 and/or the second engine 21.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A fluid circuit provided with a trucking vehicle having a transport refrigeration unit, comprising:
 a first regulator assembly defining a first fuel inlet that is arranged to receive fuel from a first fuel tank and a first fuel outlet that is arranged to provide fuel to a first engine, the first regulator assembly having a first heat exchanger assembly defining a first coolant inlet that is arranged to receive coolant from a cooling system associated with the first engine and a first coolant outlet that is arranged to provide coolant to the cooling system;
 a second regulator assembly defining a second fuel inlet that is arranged to receive fuel from a second fuel tank and a second fuel outlet that is arranged to provide fuel to a second engine associated with a transport refrigeration unit;
 the second regulator assembly having a second heat exchanger assembly defining a second coolant inlet that is arranged to receive coolant from the cooling system associated with the first engine and a second coolant outlet that is arranged to provide coolant to the cooling system.

2. The fluid circuit of claim 1, wherein the second heat exchanger assembly is arranged to heat the fuel received from the second fuel tank that is provided to the second engine of the transport refrigeration unit.

3. The fluid circuit of claim 1, the first regulator assembly defining a second fuel inlet that is arranged to receive fuel from a second fuel tank and a second fuel outlet that is arranged to provide fuel to a second engine associated with a transport refrigeration unit.

4. The fluid circuit of claim 3, wherein the first heat exchanger is arranged to heat the fuel received from the first fuel tank that is provided to the first engine and heat the fuel received from the second fuel tank that is provided to the second engine.

5. The fluid circuit of claim 1, further comprising:
a fluid pump arranged to facilitate a fluid flow of coolant from the cooling system associated with the first engine towards at least one of the first coolant inlet and the second coolant inlet.

6. The fluid circuit of claim 5, further comprising:
a heater arranged to heat the fluid flow of coolant from the cooling system.

7. The fluid circuit of claim 6, further comprising:
a controller in communication with the fluid pump and the heater, the controller programmed to, while the first engine is off, operate the fluid pump and the heater, responsive to at least one of an ambient temperature being less than a threshold and an ambient humidity being greater than a threshold.

8. A method of warming a regulator assembly, comprising:
receiving a first portion of fuel through a first fuel inlet of a first regulator assembly;
receiving coolant from a cooling system associated with a first engine through a first coolant inlet of a first heat exchanger assembly associated with the first regulator assembly;
heating the fuel received through the first fuel inlet with the coolant;
directing the coolant through a first coolant outlet of the first heat exchanger assembly towards the cooling system associated with the first engine; and
providing the first portion of fuel through a first fuel outlet of the first regulator assembly to the first engine;
receiving a second portion of fuel through a second fuel inlet of the first regulator assembly;
heating the second portion of fuel received through the second fuel inlet with the coolant; and
providing the second portion of fuel through a second fuel outlet of the first regulator assembly to a second engine associated with a transport refrigeration unit.

9. The method of claim 8, further comprising:
heating the coolant with a heater operatively connected to the cooling system.

10. A method of warming a regulator assembly, comprising:
receiving a first portion of fuel through a first fuel inlet of a first regulator assembly;
receiving coolant from a cooling system associated with a first engine through a first coolant inlet of a first heat exchanger assembly associated with the first regulator assembly;
heating the fuel received through the first fuel inlet with the coolant;
directing the coolant through a first coolant outlet of the first heat exchanger assembly towards the cooling system associated with the first engine; and
providing the first portion of fuel through a first fuel outlet of the first regulator assembly to the first engine;
receiving a second portion of fuel through a second fuel inlet of a second regulator assembly;
receiving coolant from the cooling system associated with the first engine through a second coolant inlet of a second heat exchanger assembly associated with the second regulator assembly;
heating the second portion of fuel received through the second fuel inlet with the coolant; and
providing the second portion of fuel through a second fuel outlet of the second regulator assembly to a second engine associated with a transport refrigeration unit.

* * * * *